(12) United States Patent
Gremer et al.

(10) Patent No.: US 10,507,531 B2
(45) Date of Patent: Dec. 17, 2019

(54) CUTTING INSERT FOR PROFILING TURNING AND CARTRIDGE FOR RECEIVING A CUTTING INSERT

(71) Applicant: Kennametal Inc., Latrobe, PA (US)

(72) Inventors: Helmut Gremer, Bubenreuth (DE); Frank Funke, Schwelm (DE); Dieter Rosenland, Wegberg (DE)

(73) Assignee: KENNAMETAL INC., Latrobe, PA (US)

( * ) Notice: Subject to any disclaimer, the term of this patent is extended or adjusted under 35 U.S.C. 154(b) by 169 days.

(21) Appl. No.: 14/569,826

(22) Filed: Dec. 15, 2014

(65) Prior Publication Data

US 2015/0165528 A1    Jun. 18, 2015

(30) Foreign Application Priority Data

Dec. 16, 2013    (DE) .................. 10 2013 114 124

(51) Int. Cl.
*B23B 27/00* (2006.01)
*B23B 27/16* (2006.01)

(52) U.S. Cl.
CPC .... *B23B 27/1614* (2013.01); *B23B 2200/087* (2013.01); *B23B 2200/369* (2013.01); *B23B 2205/045* (2013.01); *B23B 2205/12* (2013.01); *B23B 2215/36* (2013.01);
(Continued)

(58) Field of Classification Search
CPC .......... B23C 2200/32; B23C 2200/323; B23C 2200/326; B23B 27/06; B23B 27/065; B23B 27/04; B23B 27/045; B23B 2200/087; B23B 2200/202; B23B 29/043
See application file for complete search history.

(56) References Cited

U.S. PATENT DOCUMENTS

| 3,207,011 A | 9/1965 | Erfert |
| 3,490,117 A * | 1/1970 | Hertel ................. B23B 27/1614 |
| | | 407/101 |
| 4,065,223 A | 12/1977 | Nelson |

(Continued)

FOREIGN PATENT DOCUMENTS

| CN | 1299306 A | 6/2001 |
| CN | 1863633 A | 11/2006 |

(Continued)

OTHER PUBLICATIONS

Jan. 29, 2017 First office action.
(Continued)

*Primary Examiner* — Sara Addisu
(74) *Attorney, Agent, or Firm* — Ian K. Samways

(57) ABSTRACT

A cutting insert for profile turning, in particular for wheel profile turning, includes an upper surface, a lower surface, and side surfaces. At the transition from the upper surface to the side surfaces two cutting edges are formed for machining a workpiece and two further edges each having two ends. The two cutting edges are designed part-circular in shape and each extend from one end of one of the two edges to the opposite end of the other of the two edges. Also described is a cartridge for holding a cutting insert, the cartridge being mountable on a machine tool. The cartridge has a main seating surface having a plane angle (α) of greater than 90° to the axis of rotation (D) of the workpiece.

13 Claims, 3 Drawing Sheets

(52) U.S. Cl.
CPC ....... *B23B 2260/038* (2013.01); *Y10T 407/22* (2015.01); *Y10T 407/2276* (2015.01); *Y10T 407/235* (2015.01)

(56) References Cited

U.S. PATENT DOCUMENTS

| | | | |
|---|---|---|---|
| 4,411,565 A | 10/1983 | Hazra | |
| 4,946,319 A | 8/1990 | Lyon et al. | |
| 5,333,972 A * | 8/1994 | Bernadic | B23B 27/141 407/113 |
| 5,536,119 A * | 7/1996 | Werner | B23B 27/1622 407/113 |
| 6,142,716 A | 11/2000 | Jordberg | |
| 6,238,146 B1 * | 5/2001 | Satran | B23B 27/1614 407/113 |
| 6,761,510 B2 | 7/2004 | Kinukawa et al. | |
| 7,234,899 B2 | 6/2007 | Fang et al. | |
| 7,367,755 B2 * | 5/2008 | Wurfels | B23B 27/1618 407/113 |
| 7,520,701 B2 | 4/2009 | Kukino | |
| 7,736,733 B2 | 6/2010 | Itoh et al. | |
| 7,905,689 B2 | 3/2011 | Dufour et al. | |
| 8,702,353 B2 * | 4/2014 | Chen | B23C 5/06 407/113 |
| 8,931,979 B2 * | 1/2015 | Choi | B23C 5/06 407/113 |
| 2005/0019109 A1 * | 1/2005 | DeRoche | B23C 5/109 407/34 |
| 2007/0034063 A1 * | 2/2007 | Wurfels | B23B 27/1618 83/74 |
| 2012/0067179 A1 | 3/2012 | Ross | |
| 2012/0121345 A1 * | 5/2012 | Neiman | B23B 27/1622 407/103 |
| 2015/0071717 A1 * | 3/2015 | Morrison | B23C 5/207 407/51 |
| 2015/0165528 A1 * | 6/2015 | Gremer | B23B 27/1614 407/104 |

FOREIGN PATENT DOCUMENTS

| | | |
|---|---|---|
| DE | 4428514 A1 | 2/1996 |
| GB | 213719 | 4/1924 |

OTHER PUBLICATIONS

Jan. 7, 2019 Foreign OA.
Jun. 17, 2018 Foreign OA.
Jun. 4, 2018 Foreign OA.
Oct. 17, 2017 First Office Action.

* cited by examiner

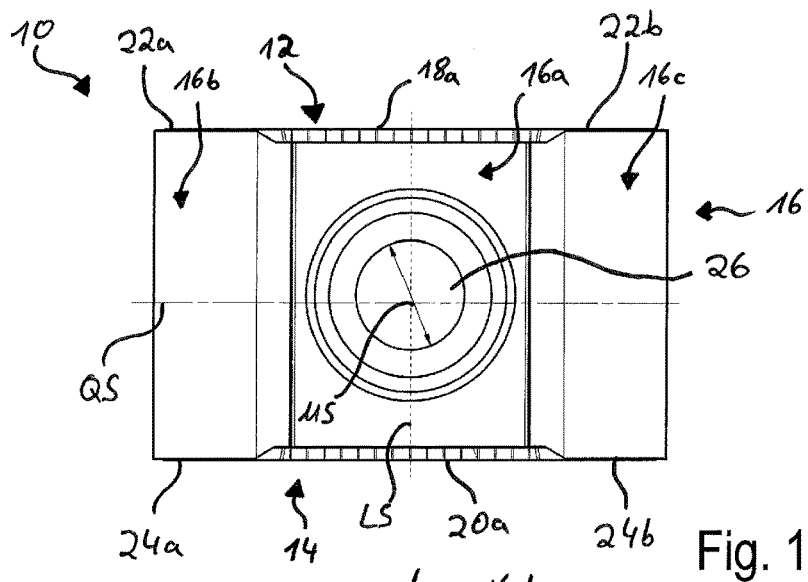
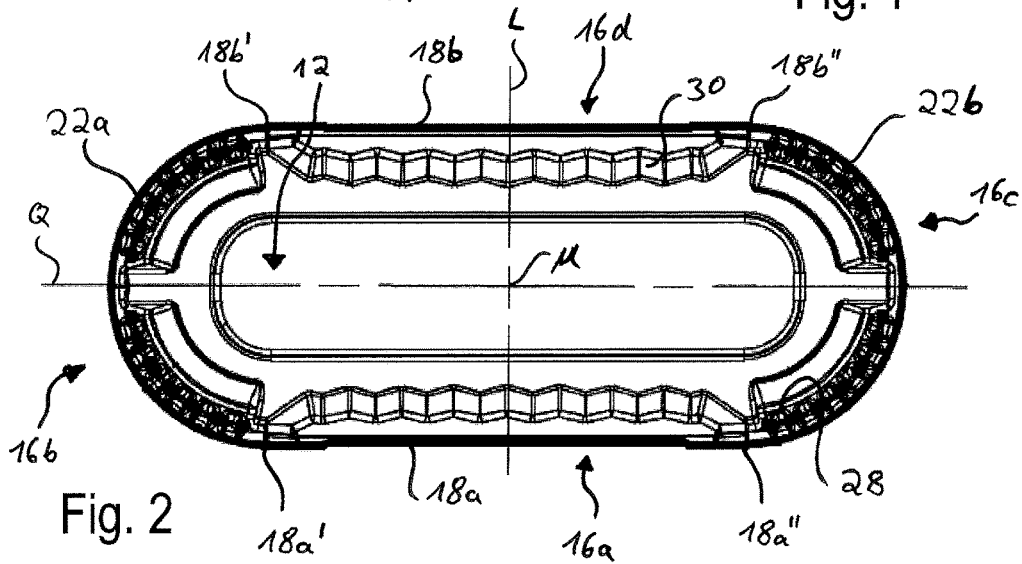
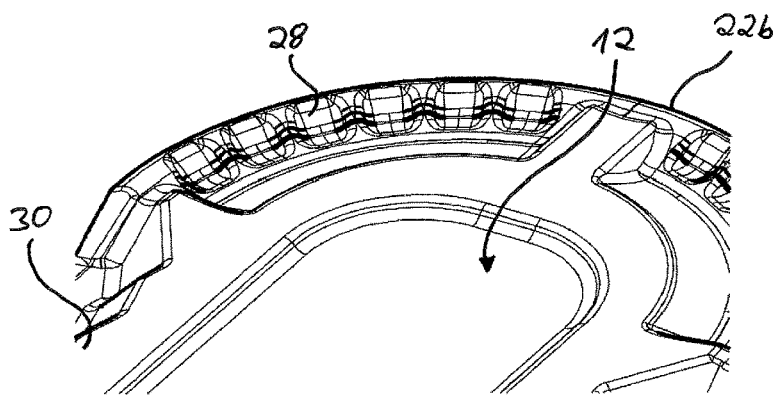

CUTTING INSERT FOR PROFILING TURNING AND CARTRIDGE FOR RECEIVING A CUTTING INSERT

CLAIM TO PRIORITY

This application is a National entry application of German Application No. 10 2013 114 124.2, filed on Dec. 16, 2013, the entire contents of which is incorporated herein by reference.

FIELD OF THE INVENTION

The invention relates to a cutting insert for profile turning, in particular for wheel profile turning, and to a cartridge for holding a cutting insert, the cartridge being mountable on a machine tool.

Such a cutting insert and the associated cartridge can be used for reworking used and new wheels, in particular railroad wheels. The cutting insert is held in the cartridge, which is mounted on a machine tool. The cartridge and the cutting insert held therein are moved along the wheel by the machine tool. In the process, the machine tool moves the cutting insert along the wheel tread surface to the wheel flange surface and then continues along the wheel flange surface. The cutting insert has, for removing worn material on the wheel tread surface and wheel flange surface, at least one cutting edge that is moved directly on the wheel tread surface and wheel flange surface. The design of the cutting edge, the associated surface of the cutting insert and regions adjoining the cutting edge make it possible to set both the cutting depth and the chip breaking properties of the cutting insert.

BACKGROUND OF THE INVENTION

It has proven problematic that the worn material to be removed that is present on the wheel tread surface and wheel flange surface has different thicknesses, and therefore different demands are placed on the cutting insert, the cutting depth thereof and the chip formation. This concerns in particular the transition from the wheel tread surface to the wheel flange surface, as chip control is particularly difficult in this region. Moreover, it is not always possible to remove all of the material in one pass, so that withdrawal and repositioning of the cutting insert is required in order to machine first the wheel tread surface and then the wheel flange surface. One or more complete cutting passes are possible as well.

SUMMARY OF THE INVENTION

The aim of the invention is therefore to enable a workpiece and in particular a wheel flange of a railroad wheel to be reworked in an efficient manner.

This aim is met according to the invention by a cutting insert for profile turning, in particular for wheel profile turning, that comprises an upper surface, a lower surface and side surfaces, wherein two cutting edges for machining a workpiece and two further edges each having two ends are formed at the transition from the upper surface to the side surfaces, the two cutting edges being designed part-circular in shape, each of them extending from one end of one of the two edges to the opposite end of the other of the two edges.

The underlying concept of the invention provides that the cutting edges formed on the cutting insert are part-circular in shape without discontinuities and therefore have a full radius. This makes it possible for a railroad wheel, i.e. the wheel tread surface and the wheel flange surface, to be machined in one pass without withdrawing the cutting insert. The advantages are attained predominantly at the transition between the wheel tread surface and the wheel flange surface, since a full-radius cutting edge makes it possible to have improved chip control. This is because the rake angle of the cutting edge on the surface of the workpiece being machined is identical over the entire cutting edge due to the part-circular full-radius cutting edge, and is therefore independent of the position of the surface to be machined of the workpiece relative to the cutting edge. Moreover, with the cutting insert according to the invention a wheel can be machined using different techniques, for example, profile turning and facing. In particular, it is possible with the cutting insert according to the invention to carry out a re-profiling of the wheels. Using the cutting insert according to the invention, the wheels can thus be machined particularly efficiently and in accordance with the particular requirements.

Depending on the size of the cutting insert and the selected cutting edge radius, correspondingly dimensioned cutting surfaces, cutting lines or cutting points are attained in the contact region of the cutting edge on the workpiece, whereby a precise reworking of the wheels is made possible.

According to one aspect of the invention, it is provided that the transition from the lower surface to the side surfaces is designed analogous to the transition from the upper surface to the side surfaces, such that the cutting insert has four part-circular cutting edges. As a result, it is possible to continue using the cutting insert in the event that one of the cutting edges should have become worn, by rotating it and using a cutting edge of the other side.

A further aspect of the invention provides that the edges run straight, in particular that they are formed parallel to one another. This creates two side surfaces extending straight and parallel with one another that can be used for seating in a cartridge, it being possible for the inner portion to be recessed. The straight side surfaces permit a large-surface seating contact, such that high forces can be transmitted from the cutting insert to the cartridge holding the cutting insert.

According to a further aspect of the invention, the part-circular cutting edges are designed semicircular in shape. The cutting edges therefore cover an angle range of approximately 180°. As a result, the transition from the cutting edge to the edge is flowing, that is to say, without corner or point.

A further aspect of the invention provides that the upper and/or lower surface is bilaterally symmetric with respect to the centrally extending longitudinal axis and/or transverse axis thereof, in particular centrally symmetric to the center. Owing to the symmetrical design of the upper and/or lower surface, the cutting insert can be used as an indexable cutting insert, since it can be rotated in the plane of the upper and/or lower surface by 180°, thereby enabling at least two cutting edges in the same cartridge to be used.

According to a further aspect of the invention, the cutting insert is bilaterally symmetric with respect to the centrally extending longitudinal and/or transverse axis thereof, in particular centrally symmetric to the center. A cutting insert designed in this way can even be used four-fold, as it can be rotated by 180° in the plane of the upper or lower surface, that is to say, of the longitudinal axis of the cutting insert, and also about the transverse axis of the cutting insert. This results in altogether four different mounting positions, such that all four cutting edges may be used. This significantly increases the life of a cutting insert.

A further aspect of the invention provides that an orifice is formed in the side surfaces on which the edges are formed that cooperates with a mounting mechanism. Via this mounting mechanism the cutting insert is mounted on the cartridge, in particular in a receiving pocket of the cartridge.

According to a further aspect of the invention, chip breakers are provided on the part-circular cutting edges and/or on the edges. The chip breakers, which are also known as chip splitters, ensure that the removed chip cannot become jammed in the machine tool, since it is split or broken after a certain length and transported away from the machine tool. The chip breakers may be of various designs, for example for roughing or finishing operations.

The aim is further met by a cartridge for holding a cutting insert, the cartridge being mountable on a machine tool and comprising a receiving pocket for a cutting insert, in particular for a cutting insert of the aforementioned type, with which a workpiece having an axis of rotation can be machined, the receiving pocket having a main seating surface against which a side surface of the cutting insert can be seated, the main seating surface having a plane angle of greater than 90° to the axis of rotation of the workpiece, in particular a plane angle of 93°. Owing to the cartridge according to the invention, an inserted cutting insert is angled, in particular via the transverse axis thereof, more steeply against the wheel tread surface, which likewise has an angle to the axis of rotation of the workpiece. Until now, cartridges have been designed in such a way that the main seating surface has an angle relative to the axis of rotation that compensates the angle between the wheel tread surface and the axis of rotation, that is to say less than 90°. This was necessary because the cutting edge was not designed to be part-circular in shape with a full radius. This, however, resulted in the problems at the transition from the wheel tread surface to the wheel flange surface, since the angle of the surface being machined to the axis of rotation changes there. Owing to the design according to the invention of the cartridge, it is ensured that worn material at the transition from the wheel tread surface to the wheel flange surface can be reliably removed in a controlled fashion. The chip breaking properties at the transition from the wheel tread surface to the wheel flange surface and at the flange of the wheel itself are likewise greatly improved by such a design of the cartridge. These advantages become even more apparent when a cutting insert having a full-radius cutting edge is used.

A further aspect of the invention provides that the cartridge has a second seating surface which is perpendicular to the main seating surface. The second seating surface improves the precise positioning of the cutting insert in the cartridge, in particular in the receiving pocket thereof, and the secure support of the cutting insert in the receiving pocket.

According to one aspect of the invention, an element of the mounting mechanism for mounting the cutting insert is provided on the main seating surface. The cutting insert is mounted mainly to the main seating surface, which is designed larger than the second seating surface, thereby improving the secure mounting of the cutting insert in the receiving pocket.

A further aspect of the invention provides that the center axis of the element of the mounting mechanism has an angle to the main seating surface other than 90°. The oblique orientation of the element of the mounting mechanism ensures that when the cutting insert is mounted it is pulled not only against the main seating surface but also against the second seating surface, such that it reaches its predetermined position. The element of the mounting mechanism may be in the form of a dowel pin. The angle between the direction of action of the fastening elements and the plane lying perpendicular to the rotational axis of the tool is preferably within the range from 5° to 25°, in particular in the order of magnitude of 8°. This angle serves to ensure that the segments, upon tightening of the fastening elements, are subjected to an axial force which is sufficiently large to position them in an axially exact manner.

BRIEF DESCRIPTION OF THE DRAWINGS

Further advantages and properties of the invention will become apparent from the following description and from the referenced drawings, in which:

FIG. 1 shows a side view of the cutting insert according to the invention,

FIG. 2 shows a top view of the cutting insert from FIG. 1,

FIG. 3 shows a perspective detail view of the upper surface of the cutting insert from FIGS. 1 and 2.

DETAILED DESCRIPTION OF THE INVENTION

Figure 4:
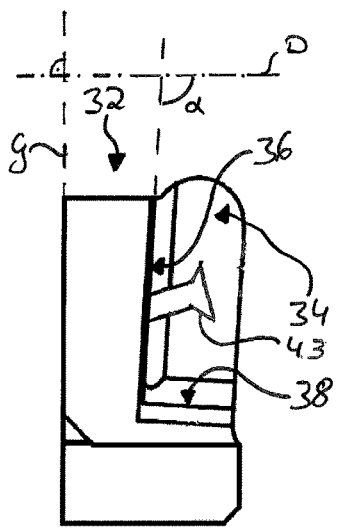
FIG. 4 shows a top view of the cartridge according to the invention.

FIG. 1 shows a cutting insert 10 in a side view. The cutting insert 10 has an upper surface 12 and a lower surface 14 which are interconnected by side surfaces 16. In FIG. 1, one side surface, 16a, is shown fully and two further side surfaces, 16b, 16c, are shown partially. The cutting insert 10 additionally has a further side surface 16d, not shown in FIG. 1, opposite the side surface 16a.

An edge 18a is formed at the transition of the upper surface 12 to the side surface 16a and an edge 20a is formed at the transition from the lower surface 14 to the side surface 16a. Furthermore, a cutting edge 22a, 22b is formed in each case at the transition from the upper surface 12 to the side surface 16b and the transition to the side surface 16c, and a further cutting edge 24a, 24b is formed at the transition from the lower surface 14 to each of the side surfaces 16b, 16c.

Additionally, at the transition of the upper surface 12 to the side surface 16d and at the transition of the lower surface 14 to the side surface 16d, respective further edges 18b, 20b are formed, which are not shown in FIG. 1, however.

The cutting insert 10 additionally has in the side surface 16a an orifice 26 extending through the entire cutting insert 10 to the opposite side surface 16d. The orifice 26 is used for mounting the cutting insert 10 on a cartridge (not shown here).

Furthermore, the cutting insert 10 is designed to be bilaterally symmetric with respect to the longitudinal axis LS and transverse axis QS thereof, resulting in the cutting insert 10 being centrally symmetric with respect to the center MS thereof.

The cutting insert 10 from FIG. 1 is shown in FIG. 2 in a top view of the upper surface 12. From FIG. 2 it can be seen that the upper surface 12 forms two straight and parallel edges 18a, 18b and two semicircular cutting edges 22a, 22b to the respective side surfaces 16. At respective opposite ends of the edges 18a, 18b the two cutting edges 22a, 22b transition into said edges. The cutting edge 22a connects a first end 18a' of the edge 18a to the opposite first end 18b' of the other edge 18b, and the cutting edge 22b connects a second end 18a" of the edge 18a to the opposite second end 18b" of the other edge 18b. Because of the semicircular design of the cutting edges 22a, 22b, the cutting insert 10 has cutting edges 22a, 22b that have a full radius and cover an angle range of approximately 180°.

The cutting edges 22a, 22b and edges 18a, 18b additionally have associated chip breakers 28, 30. Via the chip breakers 28, 30 the chips removed during reworking of a workpiece, for example a railroad wheel, can be controlled. The chip breakers 28 which are associated with the cutting edges 22a, 22b may have a different configuration than the chip breakers 30 that are assigned to the edges 18a, 18b, thereby resulting in different chip breaking properties. The chip breakers 28 are shown in detail in a perspective view in FIG. 3.

The upper surface 12 of the cutting insert 10 is designed like the lower surface 14, such that a matching identical arrangement and configuration results for the lower surface 14.

The upper and lower surface 12, 14 are both bilaterally symmetric with respect to the longitudinal axis L and transverse axis Q thereof. As a result, the upper surface and lower surface 12, 14 are each centrally symmetric with respect to the respective centers M thereof.

Figure 5:
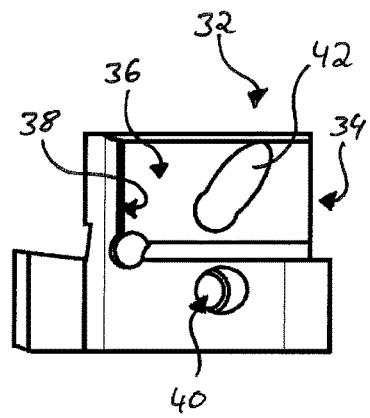
FIG. 5 shows a side view of the cartridge from FIG. 4.
Figure 6:
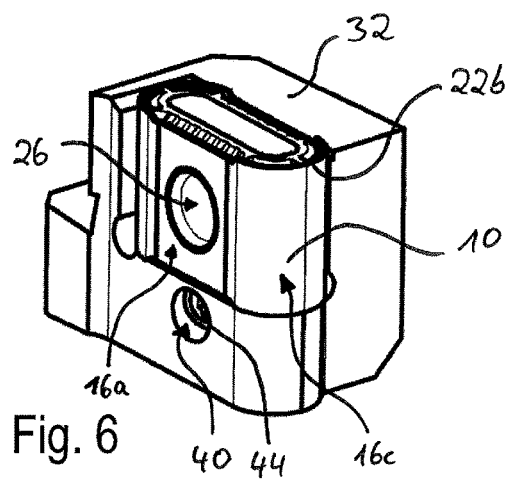
FIG. 6 shows a perspective view of the cartridge from FIGS. 4 and 5 with held cutting insert from FIGS. 1 and 2.
Figure 7:
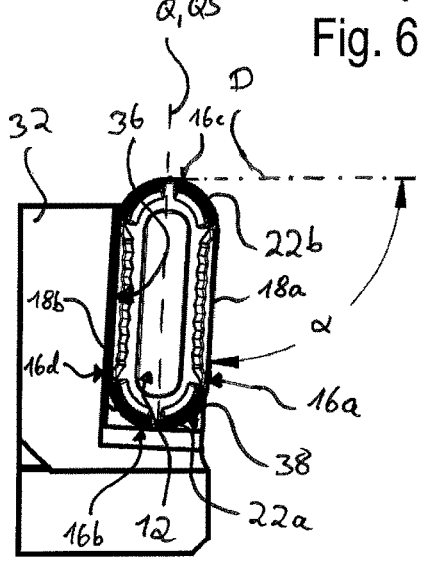
FIG. 7 shows the cartridge from FIG. 6 in a top view.
Figure 8:
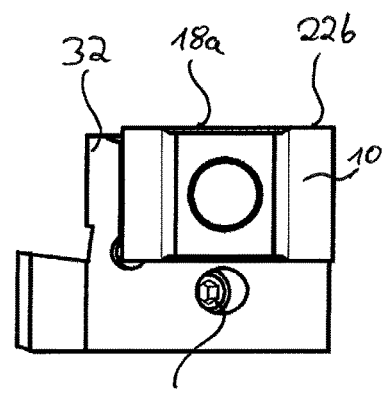
FIG. 8 shows a side view of the cartridge from FIGS. 6 and 7.

FIGS. 4 to 8 show a cartridge 32 that is used for holding the cutting insert 10, the cartridge 32 being shown in FIGS. 6 to 8 with a cutting insert 10 inserted.

The cartridge 32 has a receiving pocket 34 that accommodates the cutting insert 10. The receiving pocket 34 is formed by a main seating surface 36 and second seating surface 38, against which the inserted cutting insert 10 is seated with two of the side surfaces 16 thereof.

The receiving pocket 34 is arranged within the cartridge 32 in such a way that it is oblique relative to the general orientation G of the cartridge 32 in the plane that is perpendicular to the axis of rotation D of the workpiece to be machined (FIG. 4). Therefore the main seating surface 36 has an angle α to the axis of rotation of greater than 90°. The straight line shown in FIG. 4 as the axis of rotation D is a straight line that is shifted parallel to the real axis of rotation and therefore is for guidance.

The cartridge 32 has, for mounting the cutting insert 10 in the receiving pocket 34 thereof, a mounting mechanism that is formed in part by a mounting orifice 40 below the receiving pocket 34 and a mounting orifice 42 on the main seating surface 36 (FIG. 5). Furthermore, an element of the mounting mechanism is designed as a dowel pin 43 that can be placed on the main seating surface 38 of the cartridge 32, in particular in the mounting orifice 42 (FIG. 4).

Upon inserting the cutting insert 10, same is mounted to the cartridge 32 within the receiving pocket 34 by a mounting means 44 that will be inserted into the mounting orifice 40 and actuates the mounting mechanism (FIGS. 6-8). The dowel pin 43 extends through the orifice 26 of the cutting insert 10 inserted into the receiving pocket 34, by which dowel pin the cutting insert 10 is fixed. The center axis of the dowel pin 43 has an angle different from 90° to the main seating surface 36. As a result, the cutting insert 10 is pulled during the mounting process with a side surface 16a, 16d associated with one of the straight edges 18, 20 against the main seating surface 36 and with a portion of one of the side surfaces 16b, 16c against the second seating surface 38, thereby achieving the precisely positioned orientation of the cutting insert 10 on the cartridge 32.

In the assembly shown in FIG. 7 it is the side surface 16d associated with the edges 18b, 20b and a portion of the side surface 16b that are pulled against the main seating surface 36 and second seating surface 38, respectively.

Owing to the relative position of the receiving pocket 34 to the cartridge 32, the transverse axis QS of the cutting insert 10, the transverse axes Q of the upper and lower surfaces 12, 14, and the side surfaces 16a, 16d likewise have the angle α of greater than 90° to the axis of rotation D of the workpiece to be machined (FIG. 7). The straight line shown as the axis of rotation D in FIG. 7 is again a straight line that is shifted parallel to the axis of rotation D.

The cartridge 32 is designed in principle to have standard basic dimensions, such that it can be inserted into existing machine tools and the holders thereof.

Figure 9:
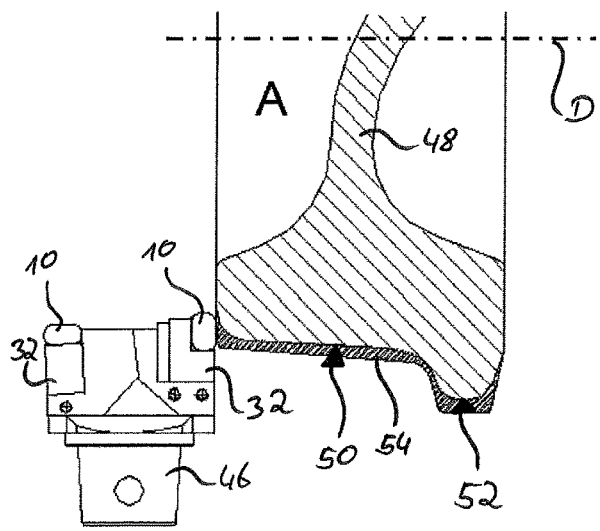
FIG. 9 shows part of a machine tool with mounted cartridge and cutting insert held therein during machining of a wheel at a first point in time A.
Figure 10:
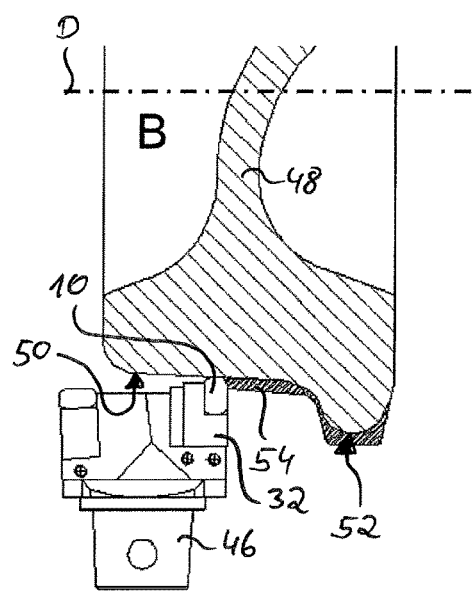
FIG. 10 shows the assembly from FIG. 9 at a second point in time B.
Figure 11:
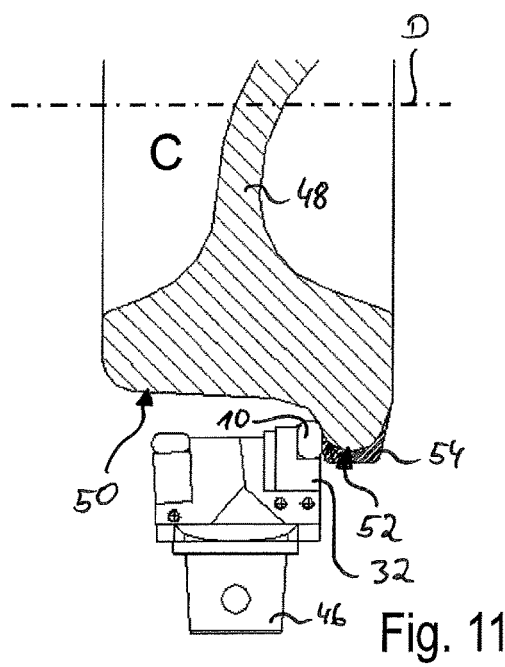
FIG. 11 shows the assembly from FIGS. 9 and 10 at a third point in time C.

FIGS. 9-11 show how the cartridge 32 including the cutting insert 10 is inserted into a holder 46 of a machine tool. The holder 46 shown here even has two cartridges 32, each including one cutting insert 10. Also shown is a workpiece 48 to be machined, in the form of a railroad wheel having a wheel tread surface 50 and a wheel flange surface 52. The axis of rotation D of the workpiece 48 is shown as well.

Over the course of the operation of the railroad wheel 48, signs of wear 54 have formed on the wheel tread surface 50 and wheel flange surface 52, which during reworking are repaired by means of the cutting insert 10 by removing a layer of the railroad wheel 48, such that a smooth wheel tread surface 50 and wheel flange surface 52 are again created. For this purpose the cutting insert 10 disposed in the cartridge 32 is moved by the machine tool along the wheel tread surface 50 and wheel flange surface 52, the railroad wheel 48 being actively turned about the axis of rotation D thereof in the process. The cutting insert 10 cuts via one of the cutting edges 18, 22, 24 thereof along the wheel tread surface 50 and wheel flange surface 52 to remove the worn material 54. The worn material 54 may consist of cracks, spalls, shifted material or flats in the wheel tread surface and wheel flange surface 50, 52.

This reworking is repeated until the railroad wheel 48 has reached a predetermined minimum measurement/profile about the periphery thereof, the railroad wheel 48 being replaced on reaching this minimum measurement so as to ensure safety.

FIG. 10 shows the material removal at a later point in time B, the cutting insert 10 already having removed approximately half of the worn material 54 on the wheel tread surface 50 of the railroad wheel 48.

In FIG. 11 the cutting insert 10 has reached, at a point in time C, the region of the transition from the wheel tread surface 50 to the wheel flange surface 52. The worn material 54 is designed particularly thin in this region, but the cutting insert 10 is nonetheless capable of machining this region without difficulty. Owing to the special angular position of the receiving pocket 34 for the basic orientation G of the cartridge 32, a steep rake angle of the cutting edge 18, 22, 24 used is generally created on the workpiece 48 to be machined, for example cutting edge 22b.

As a result of the semicircular design of the cutting edges 22, 24, a defined linear contact exists between the cutting edge 22, 24 and the surface to be machined of the workpiece 48, this linear contact being independent of the relative position of the cutting insert 10 to the workpiece 48. As a result, the workpiece 48 can be machined particularly precisely, because there is good chip control and cutting depth control.

When the cutting insert 10 has reached the center position on the wheel flange surface 52, the holder 46 is moved in such a way that the other cutting insert 10 comes into use, which has a different basic orientation in the holder 46. The other cutting insert 10, due to the orientation thereof in the holder 46, may be used to machine the other half of the wheel flange surface 52, the holder 46 not impeding the removal of the worn material 54.

Generally, the angular position of the receiving pocket 34 in the cartridge 32 and the part-circular design of the cutting edges ensure that good chip control is possible even at low cutting depths.

In the position shown in FIG. 9 the cutting insert 10 is even partially in contact with the worn material 54, with one of the edges 18, 20, and enhances the chip removal. The edges 18, 20 are used only to coarsely remove the worn material 54, which is why the chip breakers 30 associated with the edges 18, 20 typically are configured differently than the chip breakers 28 associated with the cutting edges 22, 24. However, the edges 18, 20 do not come into contact with the final contour on the workpiece 48. This takes place exclusively via one of the cutting edges 22, 24. For this reason the edges 18, 20 are not referred to as cutting edges in the context of the invention, even though they coarsely remove the worn material 54. In the position shown in FIG. 11 the respective edge 18, 20 again is not in contact with the final contour on the workpiece 48. This is ensured via the semi-circular cutting edges 22, 24 and by the relative orientation of the receiving pocket 34 with respect to the basic orientation of the cartridge 32, or via the angle α, respectively, that the main seating surface 36, the transverse axis QS, the transverse axis Q and the side surfaces 16a, 16d each have to the axis of rotation D.

In addition, it may be provided that the cutting insert 10 may have differing cutting depths and chip control, for example by providing a cutting insert 10 that has four different chip breakers 28 on the four cutting edges 22, 24, so that the cutting insert 10 covers a very wide field of cutting requirements. The same applies for the chip breakers 30 associated with the edges 18, 20.

What is claimed is:

1. A cutting insert for profile turning, comprising:
an upper surface, a lower surface and side surfaces;
wherein two cutting edges for machining a workpiece and two further edges each having two ends are formed at a transition from the upper surface to the side surfaces;
the two cutting edges each being part-circular in shape and defined by a full radius;
wherein the part-circular shape of each of the two cutting edges is formed without discontinuities, and each of the two cutting edges covers an angle range of approximately 180 degrees, whereby a defined linear contact between each of the cutting edges and a workpiece to be machined results, the linear contact being independent of a relative position of the cutting insert with respect to the workpiece;
each of the two cutting edges extending from one end of one of the two edges to an opposite end of the other of the two edges wherein the transition from the lower surface to the side surfaces is designed analogously to a transition from the upper surface to the side surfaces, such that the cutting insert comprises four part-circular cutting edges.

2. The cutting insert according to claim 1, wherein the edges run straight and are formed parallel to each other.

3. The cutting insert according to claim 1, wherein the part-circular cutting edges are semicircular in shape.

4. The cutting insert according to claim 1, wherein the upper and/or lower surface is bilaterally symmetric with respect to the central longitudinal and/or transverse axis thereof, and is centrally symmetric to the center.

5. The cutting insert according to claim 1, wherein the cutting insert is bilaterally symmetric with respect to the central longitudinal and/or transverse axis thereof, and is centrally symmetric to the center.

6. The cutting insert according to claim 1, comprising an orifice provided in the side surfaces on which the edges are formed, wherein the orifice cooperates with a mounting mechanism.

7. The cutting insert according to claim 1, comprising chip breakers provided on the part-circular cutting edges and/or on the edges.

8. A cartridge for holding a cutting insert according to claim 1, the cartridge being mountable on a machine tool and comprising a receiving pocket for the cutting insert, with which a workpiece having an axis of rotation can be machined, the receiving pocket having a main seating surface against which a side surface of the cutting insert can be seated, the main seating surface having a plane angle of greater than 90 degrees to the axis of rotation of the workpiece.

9. The cartridge according to claim 8, wherein the cartridge has a second seating surface which is perpendicular to the main seating surface.

10. The cartridge according to claim 8, wherein an element of a mounting mechanism for mounting the cutting insert is provided on the main seating surface.

11. The cartridge according to claim 10, wherein the center axis of the element of the mounting mechanism has an angle to the main seating surface other than 90 degrees.

12. The cutting insert according to claim 1, comprising a cutting insert for wheel profile turning.

13. The cartridge according to claim 8, wherein the plane angle is 93 degrees.

* * * * *